Patented June 20, 1950

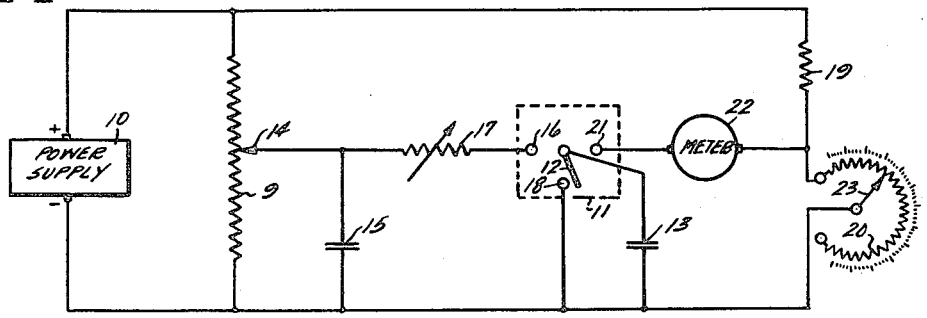
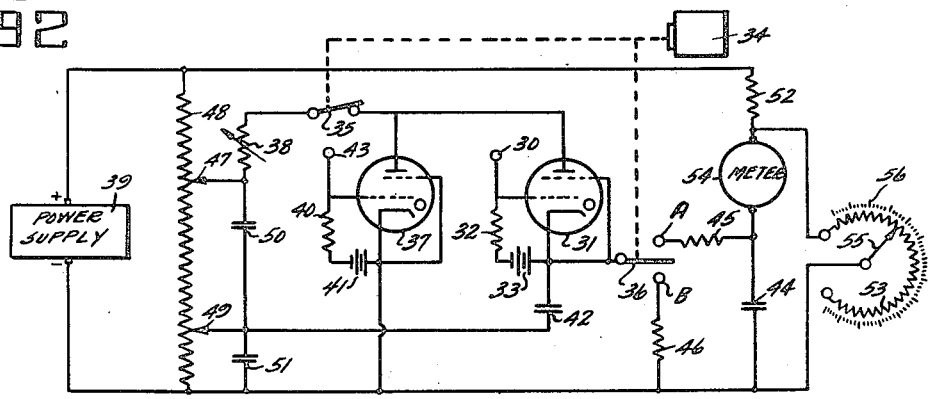
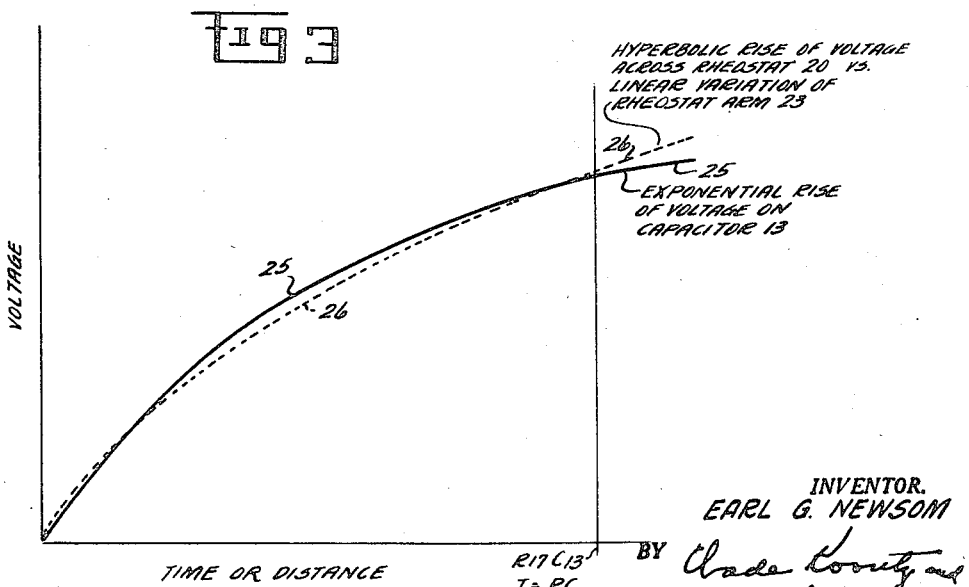
INVENTOR.
EARL G. NEWSOM

2,511,868

UNITED STATES PATENT OFFICE 2,511,868

TIME INTERVAL MEASURING DEVICE

Earl G. Newsom, Dayton, Ohio

Application July 24, 1946, Serial No. 685,884

11 Claims. (Cl. 175—381)

(Granted under the act of March 3, 1883, as amended April 30, 1928; 370 O. G. 757)

The invention described herein may be manufactered and used by or for the Government for governmental purposes without payment to me of any royalty thereon.

The present invention relates to radio distance-measuring apparatus and more particularly to an improved circuit for measuring the duration of short time intervals in such systems.

In an earlier application entitled "Radio System," Serial No. 641,161 filed January 14, 1946, of which the present application is a continuation in part, I described radio distance-measuring apparatus suitable for use in controlling airport traffic. Reference was made therein to a trigger circuit, which formed an important feature of my earlier invention. Basically, the aforementioned trigger circuit teaches how extremely short time intervals may be measured by employing two thyratrons, whereby the first thyratron is utilized to start charging a capacitor and the second thyratron is utilized to interrupt the charging of the capacitor, and the magnitude of charge on the capacitor is determined by a suitable indicator, such as a voltmeter. This indicator when calibrated in terms of time, registers the duration of the charging period.

My present invention teaches how a direct measurement of time with a high degree of accuracy can be obtained by approximately matching an exponential voltage by varying a linear resistance.

The primary object of this invention is to provide means for measuring short time intervals by varying the voltage across a linear resistance, suitably calibrated in terms of time, until a balance point is indicated on a meter.

It is a further object of this invention to provide novel means of translating the maximum level of rise of an exponential voltage on a capacitor into terms of elapsed time during rise without having to resort to the use of a nonlinear, specially wound potentiometer which is highly expensive.

Other objects, features, and advantages of the present invention will become apparent to those skilled in the art when the following description is read in connection with the accompanying drawings in which:

Fig. 1 is simplified schematic diagram illustrating the principle of my invention;

Fig. 2 is a schematic illustration of my invention as embodied in radio distance-measuring apparatus; and Fig. 3 is a comparison of typical exponential and hyperbolic characteristic curves within a limited range, with their differences exaggerated.

Referring to Fig. 1, a voltage divider 9 is connected across power supply 10 which provides, for example, 500 volts to ground or negative terminal of power supply 10, as shown. For the time being, a switching device 11 is shown in Fig. 1 merely to illustrate a particular principle, and in Fig. 2 it will be shown how the functions performed by switch 11, Fig. 1, may be performed automatically.

Switch 11 comprises a movable switch arm 12 connectable to any one of three stationary terminals. A memory capacitor 13 is connected between switch arm 12 and ground or negative terminal of power supply 10, as shown. A movable tap 14 on voltage divider 9 is adjusted to a point having approximately three fifths of the voltage of the divider. An initially charging capacitor 15 is connected between movable tap 14 and ground or negative terminal of power supply 10, as shown to provide a low impedance source of potential. Between tap 14 and a first stationary terminal 16, is connected a variable resistor 17 that also is in series with capacitor 15 between terminal 16 and ground, or the negative terminal of power supply 10. A second stationary terminal 18 is connected directly to ground or negative terminal of power supply 10, as shown.

It will be seen that if switch arm 12 is connected to terminal 16, capacitor 13 will assume a charge from across the plates of capacitor 15 and will charge exponentially at a rate depending on the value of resistor 17, to a level of voltage approaching 300 volts, depending on the period of time during which switch arm 12 is connected to terminal 16. Switch arm 12 may also be connected to terminal 18 to discharge capacitor 13 to ground, in order that a succeeding voltage placed on capacitor 13 may build up from a zero value.

According to the potentiometer method of measuring voltage, the voltage across capacitor 13 may be measured by matching it to a known voltage of corresponding polarity. The matching voltage may be obtained from a rheostat suitably supplied from voltage divider 9. To accomplish the aforementioned measurement, I have connected a resistor 19 in series with a rheostat 20, across voltage divider 9, resistor 19 being connected to the high voltage end of divider 9. Between the junction point of resistor 19 with rheostat 20, and the third stationary terminal 21, I have connected a suitable indicating meter 22, such as an electronic voltmeter having a high input resistance for example. The movable arm 23 of rheostat 20 may be so adjusted that the voltage across the rheostat may be made equal to the voltage on capacitor 13 when switch arm 12 is connected to terminal 21. Whether or not a balanced voltage condition exists across capacitor 13 and rheostat 20, may be determined by observing meter 22. During the time the charge on the capacitor 13 is being read, the capacitor 15 is arriving again at a new balanced charge that is not applied to the capacitor 13 until the switch arm 12 had been successively applied to terminals 18 and 16.

Let us assume that switch arm 12 is connected to terminal 18 until capacitor 13 is completely discharged. If switch arm 12 is then moved to terminal 16 for a given period of time "$t$," during which capacitor 13 builds up a voltage of, let us say 150 volts, after which switch arm 12 is connected to terminal 21, then rheostat arm 23 may be moved in a direction indicated by meter 22 until the voltage across rheostat 20 corresponds to the voltage across capacitor 13. To insure accuracy in making the final adjustment, it may be necessary to repeat the aforementioned cycle so that the 150 volts initially gained by the capacitor 13 will not be allowed to decay while the rheostat voltage is being brought up to the value of the capacitor voltage.

In actual practice, the switch function performed by switching device 11 is accomplished by electronic and mechanical means to demarcate the charging period more sharply and to increase the repetition rate of the "discharge-charge-measurement" cycle.

Let us further assume the following definitions of symbols:

$E_9$ = Voltage across divider 9,
$E_{13}$ = Voltage across capacitor 13,
$E_{14}$ = Voltage at tap 14,
$E_{22}$ = Voltage across meter 22,
$R_{17}$ = The resistance of resistor 17,
$R_{19}$ = Resistance of fixed resistor 19,
$E_{23}$ = Voltage at the contact point of rheostat arm 23.
$t_{13}$ = Charging time of capacitor 13,
$C_{13}$ = Capacitance of capacitor 13,
$R_{23}$ = Resistance at the contact point of rheostat arm 23,
$K$ = A constant.

If capacitor 13 is charged during time $t$, and if $E_{14}/E_9$ and $R_{19}$ have appropriate values, then $R_{23}$ is approximately equal to $Kt$ when $R_{23}$ is adjusted to make $E_{22}$ equal 0. $K$ is independent of $t$ and $R_{23}$, and dependent on the time constant $R_{17}C_{13}$. Assuming $R_{23}$ equals $Kt$, the maximum error in $t$ is less than $0.02t$ for values of $E_{13}/E_{14}$ approximately up to the ratio of 3/5.

Referring now to Fig. 2, I have shown schematically how the principle employed in Fig. 1 may be applied to a preferred embodiment of my invention in a radio distance-measuring trigger circuit similar to that disclosed in Fig. 4 of my aforementioned copending application.

A pulse initiating the time interval to be measured is introduced at terminal 30 with the switch 35 closed and the switch 36 open. The terminal 30 is connected to the control grid of a thyratron tube 31. The arrival of the pulse causes the tube 31 to conduct and charge capacitor 42. The control grid of tube 31 is connected to the cathode thereof through grid resistor 32 and a suitable bias voltage source 33 which normally keeps the tube in a nonconducting state. A suitable motor 34 actuates the switches 35 and 36 in a sequence which will become evident as the description progresses. The switch 35 remains closed and the switch 36 open for a time slightly longer than the time interval between the initiating pulse and a returned pulse or echo. A second thyratron 37 is provided, its anode being connected to the anode of thyratron 31, the anodes of both thyratrons being connected through switch 35 and variable resistor 38 to a tap 47 on a suitable source of positive voltage such as a voltage divider 48 connected across power supply 39. The control grid of thyratron 37 is connected to its cathode through a grid resistor 40 and a suitable bias voltage source 41, which normally keeps the thyratron in a nonconducting state. The cathode of thyratron 37 is connected to ground, while the cathode of thyratron 31 is connected through a capacitor 42 to a tap 49 at some point above ground potential on divider 48, say for example at 28 volts. A capacitor 50 is connected between tap 47 and tap 49. Another capacitor 51 is connected between tap 49 and ground. These capacitors are provided for the purpose of having a low impedance source of potential. The returned pulse terminating the time interval is applied to terminal 43 in the trigger circuit shown in Fig. 2, causing tube 37 to conduct, stopping the conduction of tube 31 and stopping the charging of the capacitor 42. The magnitude of charge on the capacitor 42 depends upon the length of the time interval between the initiating and terminating pulses.

At a point in time after the firing of thyratron 37 but before the next initiating pulse, the motor 34 opens switch 35 and moves switch 36 from the open position to position A. The plate voltage supply to both thyratrons is thus interrupted, and thyratron 37 returns to a nonconducting state, thyratron 31 already being in a nonconducting state as explained previously. With switch 36 in position A, a memory capacitor 44 is charged through a resistor 45 by the charge developed across capacitor 42 during the measured time interval. Capacitor 44 is preferably of a relatively small value to minimize the slight error introduced in the process of charging it. Switch 36 is then moved to position B and remains there long enough to allow capacitor 42 to discharge through resistor 46. Switch 35 is then closed by the motor 34 and the switch 36 is returned to the open position before the next initiating pulse is applied to the control grid of thyratron 31, whereupon the cycle is repeated. A low pulse repetition rate may be employed, a complete cycle occurring, for example, once every second, the memory capacitor 44 maintaining the indicating charge.

It will now be shown how the method of measurement taught in Fig. 1 is adapted to the trigger circuit of Fig. 2 to determine the level of charge on capacitor 44. A resistor 52 in series with rheostat 53 is connected across voltage divider 48, resistor 52 being connected to the high voltage end of divider 48. Between the junction point of resistor 52 with rheostat 53, and resistor 45, is connected a suitable indicating meter 54, such as an electronic voltmeter having a high input resistance. A movable arm 55 of rheostat 53 may be so adjusted that the voltage across the rheostat may be made equal to the voltage on capacitor 44. A calibrated scale 56 on rheostat 53 will thus provide the observer with continuous and accurate range information in terms of time or directly in terms of distance, as desired.

Fig. 3 illustrates the similarity between two curves, 25 and 26, within an initial range. Curve 25 is typical of the exponential rise of voltage on capacitor 13 in the circuit shown in Fig. 1. Curve 26 illustrates the hyperbolic rise of voltage across rheostat 20, Fig. 1, versus linear variation of the rheostat arm 23. It will be noted that within the time of the time constant $R_{17}C_{13}$ of the exponential curve, that both curves 25 and 26 nearly coincide. Therefore, within this initial range, a linearly wound rheostat, such as rheostat 20 of Fig. 1, may be utilized in combination with a resistor, such as resistor 19, in lieu of an expensive non-linear potentiometer. Beyond the time of the time constant of curve 25, the error increases substantially. However, the preferred embodiment of my invention is designed to measure periods of time which are no greater than that of the time constant of the circuit employed.

It will be observed that identical periods of charge of capacitor 42, Fig. 2, will result in identical levels of capacitor voltage, provided of course that prior to each charge, capacitor 42 has zero voltage thereon. Therefore, the period of charge, as defined by the interval between demarcating pulses applied to terminals 30 and 43 respectively of Fig. 2, will always be a function of time, and if the demarcating pulses represent transmitted and reflected radar pulses respectively, then the period of time may be translated into terms of distance.

Small fixed errors in the system can be corrected by proper calibration of meter 54 and by proper adjustment of resistor 38.

The trigger circuit herein described is capable of measuring extremely short time intervals in the order of small fractions of a microsecond. By employing two thyratrons with their cathodes at different fixed potentials, the time intervals may be demarcated by the ionization times of the thyratrons, one initiating the time interval, and the other terminating it. Furthermore, the present invention permits the use of very low pulse repetition rates thereby simplifying a radio control system for aircraft traffic where many channels may be required.

It should be understood that the time measuring system as set forth herein may be advantageously employed wherever time intervals between discrete pulses are to be measured with accuracy. Thus, the present invention may find use in pulse-echo radar systems where a slow repetition rate and high accuracy are important factors.

I claim:

1. A radio circuit for measuring short-time intervals, comprising a power suppy, a voltage divider connected across said power supply, a load circuit connected across said voltage divider, a fixed resistor in said load circuit, a rheostat in series with said fixed resistor in said load circuit and having a scale, an adjustable arm for varying the resistance introduced by said rheostat in said load circuit, a switch having a movable switch arm adapted for sweeping across a plurality of switch contacts, a first capacitor connected between said switch arm and ground, a ground contact engageable by said switch arm for grounding both plates of said capacitor and effecting substantially the complete discharge thereof, a second contact engageable by said switch arm, a variable resistor connected to said second contact, a tap adapted for being adjustably positioned along said voltage divider and connected to said second switch contact through said variable resistor, a second capacitor connected between the junction of said variable resistor with said tap and ground, a third switch contact engageable by said switch arm, and a balancing meter connecting said third switch contact with the junction of said fixed resistor with said rheostat in the load circuit of said voltage divider for indicating a potential balance between said first capacitor and said rheostat upon the adjustment of said rheostat arm upon said rheostat so that the rheostat scale reading is a meaurement of the time interval during which said first capacitor is charged.

2. A radar range indicator for measuring the duration of short-time intervals, comprising a power supply, a voltage divider connected across said power supply and providing direct current potential to a load circuit, a fixed resistor in the load circuit, a variable rheostat in series with said fixed resistor in said load circuit, first capacitor means connected across a predetermined portion of said voltage divider and chargeable thereby during a time interval between the reception of a pair of initiating and terminating pulses, a switch means having a movable arm connected to one side of said first capacitor, a contact engageable by said switch arm, a meter connected between the junction of said fixed resistor with said rheostat and said switch contact, a second capacitor connected between said switch contact and the low side of said voltage divider whereby said first capacitor is adapted to charge said second capacitor upon causing said switch arm to engage said switch contact whereupon said adjustable rheostat may be brought to substantially the same potential as said second capacitor as indicated upon said meter for providing a rheostat reading comparable with the time interval between initiating and terminating pulses.

3. A time measuring radio circuit, comprising a direct current power supply, a time measuring capacitor adapted for receiving a charge from said direct current power supply, a switch comprising a switch arm connected to said capacitor and sweeping a plurality of contacts, its engagement with one of said contacts being adapted for discharging said time measuring capacitor preparatory to receiving a charge, a variable resistor connected by operation of said switch arm to be placed in series with said capacitor for adjusting the magnitude of the charge imposed thereupon from said power supply, a fixed resistor associated with said power supply, a rheostat for being balanced against the charge upon said capacitor by operation of a movable arm and connected in series with said fixed resistor across said power supply, and a null current indicating means connected between a contact of said switch and the junction of said fixed resistor with said rheostat for indicating the absence of current flow between said time measuring capacitor and said rheostat upon the adjustment of the rheostat arm whereby a time interval between successive positioning of the arm of said switch with said variable resistor and with said null current indicating means may be measured.

4. A distance measuring accessory to radio apparatus, comprising a direct current source, a voltage divider across said direct current source, a high voltage first tap engaging said voltage divider, a first electronic tube having a plate, control grid, and cathode and adapted for receiving an initiating pulse upon its control grid for causing said tube to conduct, a low voltage second tap engaging said voltage divider at a position of lower potential than the position of said first tap for applying a predetermined voltage determined by the settings of said taps across said first tube, a large capacity storage first capacitor connected between the cathode of said first tube and said second tap and assuming a charge from across the portion of said voltage divider between said taps upon the conduction of said first tube, a second tube having a plate connected to the plate of said first tube and having a control grid and a cathode and adapted for terminating the conduction of said first tube upon the application of a terminating pulse to the control grid of said second tube and terminating the period of charge for said first capacitor, a first switch means releasably conducting plate potential to both tubes during the charging of said storage first capacitor and then opened momentarily to interrupt the tube plate voltage supply, a fixed resistor connected to the high voltage terminal of said voltage divider, a rheostat in series with said fixed resistor across said voltage divider and having a movable arm connected with the low voltage side of said voltage divider, a small capacity memory second capacitor having one terminal connected to the low voltage side of said voltage divider, a null voltage indicating meter having one terminal connected to said memory capacitor and another terminal connected with the junction of said fixed resistor and said rheostat, a second switch means having a movable arm connected through said first capacitor to said low voltage second tap on said voltage divider and to the cathode of said first tube and adapted for selectively engaging a grounded switch contact connected to the low voltage side of said voltage divider for discharging said first capacitor preparatory to applying a charge thereto and for selectively engaging a memory capacitor switch contact connected between said meter and said memory second capacitor for transferring charge from said storage first capacitor to said memory second capacitor preparatory to causing said second switch means to assume an open position in which position said storage first capacitor may be recharged during the adjustment of said rheostat arm in balancing the resistance of said rheostat against the charge on said memory second capacitor to a null position upon said meter provides a distance measurement from said rheostat.

5. The combination of a power supply providing a direct current voltage to a distance measuring circuit, a voltage divider connected across said power supply, a load circuit connected across said voltage divider, a first thyratron having a plate adjustably connected to a high voltage contact on said voltage divider, a first thyratron control grid to which a time interval initiating pulse may be applied for causing said thyratron to conduct, and a first thyratron cathode, a first capacitor connected between the cathode of said first thyratron and a low contact on said voltage divider, a second thyratron having a plate connected to both the plate of said first thyratron and releasably to the high voltage contact on said voltage divider, a second thyratron control grid to which a time interval terminating pulse may be applied for causing said second thyratron to conduct and terminate the conduction of said first thyratron, and a second thyratron cathode connected to the low side of said load circuit on said power supply, a first switch means for terminating the conduction of said second thyratron, a second switch means comprising a plurality of contacts and a switch arm connected to said first capacitor in series with the low contact on said voltage divider, a second capacitor connectable through said second switch means to said first capacitor to arrive at a potential in balance with the potential of said first capacitor during the time interval between initiating and terminating pulses and to disconnect said capacitors from each other, a fixed resistor in series on the load circuit side of said voltage divider, a rheostat comprising a rheostat resistor in series with said fixed resistor on the load circuit side of said voltage divider through a rheostat arm adjustably connecting the low side of said load circuit with said rheostat resistor, a rheostat scale across which said rheostat arm is adapted to sweep, and a meter in series with said fixed resistor and said second capacitor on the load circuit side of said voltage divider, said meter and second capacitor being connected in series across said rheostat so that a relative potential across said second capacitor may be balanced by the adjustment of said rheostat arm upon said rheostat resistance to provide a reading of the distance traveled by signal between the initiating pulse and the terminating pulse while said first thyratron is applying a new charge on said first capacitor.

6. A circuit for measuring a time interval between an initiating pulse and a terminating pulse, comprising a direct current power supply, a voltage divider having a high side and a low side and connected across said power supply, a fixed first resistor having one terminal connected to the high voltage side of said voltage divider, a rheostat having a movable arm connected with the low voltage side of said voltage divider and a rheostat resistance engaged thereby to be adjustably connected in series with said fixed first resistor across said voltage divider, a meter having a first terminal connected with the junction of said fixed resistor and the resistance of said rheostat, a memory first capacitor connected between a second terminal of said meter and the low voltage side of said voltage divider, a first higher potential tap adjustably contacting said voltage divider, a second lower potential tap adjustably engaging said voltage divider to provide a predetermined potential between said first tap and said second tap, a second capacitor between said first tap and said second tap, a third capacitor between said second tap and the low side of said voltage divider, a first thyratron having a plate, a control grid, a cathode and a screen grid, a second thyratron having a plate, a control grid, a screen grid and a cathode and having its plate connected with the plate of said first thyratron, a first switch adapted for connecting said first tap with the plates of both of said thyratrons, a variable second resistor connected between said first switch and said first tap, a time charged fourth capacitor connected in series between said second tap and the cathode of said first thyratron, a control grid bias applied to the control grid of the first thyratron, an initiating pulse terminal connected with the control grid of said first thyratron, a control grid bias for the control grid of said second thyratron, a terminating pulse terminal connected with the control grid of said second thyratron, the screen grid and cathode of said second thyratron being connected to the low voltage side of said voltage divider, a second switch having a movable arm connected through said time charged fourth capacitor to the lower potential second tap on said voltage divider and said movable arm connected to the screen grid and the cathode of the said first thyratron and adapted for engaging either of two contracts, the arm of the second switch engaging one of its contacts for causing the discharge of said fourth capacitor preparatory to the application of a charge thereto by the conduction of said first thyratron upon the application to the control grid thereof of an initiating pulse, and the arm of the second switch engaging the second of its contacts for transferring the charge from said fourth capacitor to said memory first capacitor, a resistor connected between the first contact of said second switch and the low voltage side of said voltage divider, a resistor connected between said second contact of said second switch and the junction of said meter with said memory first capacitor, whereby said second switch is opened preparatory to the adjustment of the movable arm on said rheostat to a position at which said meter indicates no current flow between said memory first capacitor and said rheostat at which the reading of said rheostat arm indicates the duration of time between the initiating and the terminating pulses.

7. A radio distance measuring apparatus, comprising in combination a voltage divider provided with tap means for drawing a desired potential therefrom, a first thyratron across which the fractional potential from the voltage divider may be releasably applied and having positive and negative electrodes and a control grid, an initially charging first capacitor connected between the negative electrode of said first thyratron and the lower potential of the fractional potential drawn from said voltage divider and assuming a charge upon a signal being impressed against a negative bias upon the control grid of said first thyratron and causing said thyratron to fire, a second thyratron having a positive electrode connected with the positive electrode of said thyratron and releasably connected with the upper tap of the fractional potential drawn from said voltage divider and having a negative electrode connected with the lower terminal of said voltage divider and having a control grid to which a second signal may be applied against a negative bias for causing the second thyratron to fire and extinguish the first thyratron and terminate the application of charge to said initially charging capacitor, a memory second capacitor adapted for being removably connected across said initially charged first capacitor and a portion of said voltage divider, resistor means shunting said voltage divider and consisting of a fixed resistor connected in series with a variable resistor, a meter connected between the junction of the fixed and variable resistors and a plate of said memory second capacitor adapted for being releasably connected to the cathode of said first thyratron, and a distance indicating arm on said variable resistor movable therealong in arriving at a match with the electric charge on said memory second capacitor indicated by a null reading on said meter with the connection between the memory second capacitor and the cathode of said first thyratron interrupted.

8. In a time interval measuring device, a first circuit responsive to change in condition at the beginning and end of the interval to be measured; a large capacity storage first condenser in said first circuit, a first electronic tube in said first circuit and having a cathode circuit in which said storage first condenser is connected and said first tube being placed into conduction at the start of the period to be measured for charging said storage first condenser during such period of conduction, a second electronic tube in said first circuit and adapted for terminating a period of charge on said storage first condenser by quenching the conduction of said first electronic tube; a time interval indicating second circuit, a memory second condenser in said second circuit, a null indicating meter in said second circuit, an adjustable variable potentiometer in said second circuit and across the terminals of which said second condenser and said meter are connected in series, switch means releasably connecting said first and said second circuits for imparting a fraction of the charge on said storage first condenser upon said memory second condenser whereupon the variable potentiometer may be adjusted to indicate the length of the time interval to be measured by being caused to oppose the charge on said memory second condenser as indicated by said null indicating meter, and means for discharging said storage first condenser preparatory to the application of a new charge thereto.

9. In a time interval measuring device, a first circuit responsive to a change in condition at the beginning and end of the interval to be measured; a first electronic tube having a cathode and connected in said first circuit, a large capacity storage first condenser in the cathode circuit of said first electronic tube and charged during the period of conduction of said first tube, a second electronic tube in said first circuit for quenching the conduction of said first electronic tube and the charging of the said storage first condenser at the end of the time interval to be measured, a time measuring memory condenser containing second circuit connected with said first circuit, a variable potentiometer graduated in time intervals in said second circuit, a memory second condenser in said second circuit, a null indicating instrument connected in series with said second condenser across said variable potentiometer, switch means releasably connecting together then disconnecting said first and second condensers whereafter the charge on said memory second condenser assumed from said first condenser is balanced by the setting of the potentiometer at the null indication on said instrument as a measure of the time interval during which the said first electronic tube starts and ends its period of conduction.

10. In a time interval measuring device, a first circuit responsive to change in condition at the beginning and end of the interval to be measured; a low impedance source of potential supplying a predetermined voltage to said first circuit, a large capacity storage first condenser in said first circuit, a normally nonconducting first electronic tube having a cathode circuit in which said first condenser is connected and is charged during the period of conduction of the first tube and said first tube having a plate and a control grid normally biased to cutoff; a normally nonconducting second electronic tube means having a plate connected with the plate of said first tube and quenching the conduction of said first tube and arresting the charging said storage first condenser at the end of the time interval to be measured; a time interval indicating second circuit, a small capacity memory second condenser in said second circuit, switch means releasably connecting said first and second condensers in parallel to ground and imparting charge from said first condenser to said second condenser, a variable potentiometer in said second circuit and having a scale calibrated to read in units of time, a null indicating instrument connected in series with said memory second condenser across the terminals of said potentiometer so that the reading on the potentiometer scale with the indicating instrument at a null position indicates the time duration of conduction of said first electronic tube.

11. In a time interval measuring device, a first circuit responsive to change in condition at the beginning and end of the interval to be measured; a time interval indicating second circuit, a power supply applied directly to said second circuit, voltage divider means shunting said power supply and variably tapped intermediate its ends for supplying potential to said first circuit, a first thyratron in said first circuit and having plate, grid and cathode electrodes and normally biased for nonconduction, a large capacity storage first condenser connected between the cathode of said first thyratron and said voltage divider so that the first condenser assumes charge during the conduction of said first thyratron following the application of signal to the grid thereof, a normally nonconducting second thyratron in said first circuit and having plate, grid and cathode electrodes with its plate electrode connected to the plate of said first thyratron and its cathode connected to the low side of said power supply, switch means connecting the cathode of said first thyratron to said second circuit, variable potentiometer means in said second circuit, resistor means in series with said potentiometer across the power supply, a small capacity condenser in said second circuit and releasably connected with said storage first condenser through said switch means, and a null indicating meter means connected in series with said memory second condenser across the terminals of the said potentiometer to provide a null reading upon the balancing of the charge on said memory second capacitor by the adjustment of said potentiometer that then indicates the duration of the time interval during which said first thyratron applies charge to said storage first condenser, and means for substantially removing charge from said storage first condenser.

EARL G. NEWSOM.

REFERENCES CITED

The following references are of record in the file of this patent:

UNITED STATES PATENTS

| Number | Name | Date |
|---|---|---|
| 2,021,766 | Bwens | Nov. 19, 1935 |
| 2,271,478 | Eldredge | Jan. 27, 1942 |
| 2,301,195 | Bradford | Nov. 10, 1942 |
| 2,377,969 | Richter | June 12, 1945 |
| 2,403,557 | Sanders | July 9, 1946 |
| 2,411,573 | Holst et al. | Nov. 26, 1946 |
| 2,422,654 | Bruce | June 24, 1947 |
| 2,422,655 | Hecht | June 24, 1947 |

FOREIGN PATENTS

| Number | Country | Date |
|---|---|---|
| 469,417 | Great Britain | July 26, 1937 |

OTHER REFERENCES

Publication "Academi Des Sciences," July 9, 1934, pages 123–126.